Oct. 10, 1950          J. DESSART          2,525,212
VEHICLE BRAKE WITH AUTOMATIC ADJUSTMENT
Filed June 5, 1947
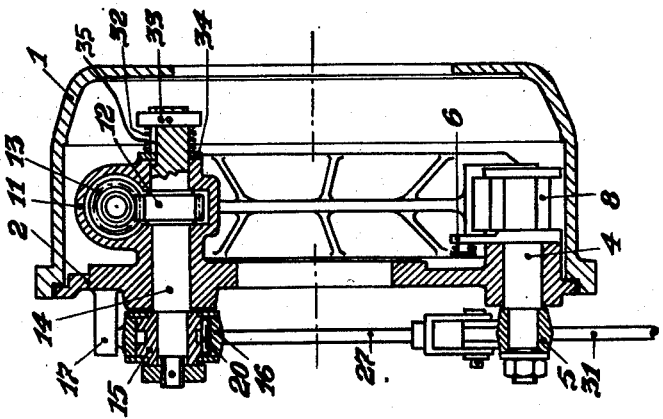
Inventor
J. Dessart
By Glascock Downing Reeth
Attys Patented Oct. 10, 1950

2,525,212

UNITED STATES PATENT OFFICE 2,525,212

VEHICLE BRAKE WITH AUTOMATIC ADJUSTMENT

Jean Dessart, Brussels, Belgium, assignor to Clayton Dewandre Company Limited, Lincoln, Great Britain Application June 5, 1947, Serial No. 752,724
In Belgium February 16, 1946

Section 1, Public Law 690, August 8, 1946
Patent expires February 16, 1966

4 Claims. (Cl. 188—79.5)

In the standard brake devices with two shoes actuated by cam means, the force applied to these shoes is a function of the transmission ratio of the brake rigging and of the force that the driver can exert upon the pedal.

With this limited effort of the driver it would be possible to succeed in exerting a considerable force upon the brake shoes if it were possible to increase the transmission ratio of the brake rigging in the required proportions. This arrangement, however, would require such a substantial displacement of the brake pedal that it would not be possible for the driver to do the work. It is well known that the stroke of the brake pedal is limited in practice to a value which rarely exceeds 200 millimetres.

On the other hand, when too large a brake-rigging transmission ratio is utilised, it is necessary to proceed to an adjustment of the brakes very frequently.

The object of the present invention is to remedy the disadvantages set forth above by increasing the brake-rigging transmission ratio while still conserving a normal stroke for the pedal, and providing for automatically adjusting and taking up lost motion due to wear of the brake lining. To this end, according to the invention the first part of the stroke of the brake pedal is utilised for the purpose of applying the shoes to the brake drum through the medium of the cam acting upon one end of each of these shoes, while the braking effort properly so called is transmitted by a force-multiplying mechanism acting upon the other end of each shoe, the said mechanism being so constructed that the position of its elements is not modified during the return stroke of the control member so as to keep the distance between the shoes and the drum constant whatever the wear of the brake linings may be.

One form of construction of the device according to the invention will now be described by way of example with reference to the accompanying drawings, in which:

Figure 1 shows a cross section of the device;
Figure 2 is a view in section on the line II—II in Figure 1; and
Figure 3 shows the control levers, with cross section of certain elements of Figure 2.

The device comprises a brake drum 1, rigid with the wheel of the vehicle (not shown), with a brake plate 2, and with two shoes 3 and 3'. A cam shaft 4, rigid with a lever 5, pivots in the plate 2, and carries a cam 8. The shaft 4 carries a finger 6, to which is hooked a return spring 7. The shape of the cam 8 is such that after it has effected a certain rotation represented by the angle alpha and corresponding to the bringing of the brake lining into contact with the brake drum the radius remains constant. One extremity of each of the shoes 3 and 3' is in contact with the cam 8 through the medium of rollers 9 and 9', and the shoes are constantly urged against the cam 8 by a spring 10.

The effort-multiplier is composed of a gear casing 11, in which are lodged two screw wheels 12 and 13, with their axes perpendicular to one another. The screw 12 is rigid with a shaft 14, at the end of which is mounted a free-wheel lever device. This device comprises a hub 15, keyed to the shaft 14. Upon this hub there turns freely a lever 16, which is urged against an abutment 17 by a spring 18. The hub 15 is provided with notches 19, in which are provided rollers 20, which, when the lever 16 turns in the direction of the arrow F, render the latter virtually rigid with the hub 15. When turning in the direction opposite to the arrow F the lever 16 disengages the rollers 20 and returns freely against its stop 17, the hub 15 having retained the position to which the lever 16 had brought it. The screw wheel 13 is prolonged in its axial direction by two screws 21 and 22, one on each side, with left-handed and right-handed threads respectively, these screws screwing into nuts 23 and 24, sliding in the casing 11. On the outer ends 25 and 26 of the nuts 23 and 24 are pivotally mounted the shoes 3 and 3'. The lever 5 of the cam shaft 4 is connected with the lever 16 by a link 27 provided with cheek 28. The latter has a slot guide 29, the length of which corresponds to the amplitude of the angular displacement of the lever 5 and of the cam 8 that is necessary for bringing the rollers 9 and 9' over the cylindric periphery of the cam without acting on the lever 16.

The regulation of the brake, when mounted, is manually effected by acting before on the brake shoes 3 and 3', by means of the lever 5, which moves the cam 8 and brings the cylindric surface of the latter into contact with the rollers 9 and 9', the brake shoes pivoting at 25 and 26. The lever 5 is then maintained in this position while the lever 16 is manually actuated by a reciprocating movement which is rendered possible by the free wheel device 19—20, so as to act on the shaft 14, the screw wheel 13 and the screws 21 and 22, until the shoes 3 and 3' come into contact with the brake drum 1. The lever 16 is then allowed to return to its stop 17, and the cam 8 is returned to its initial position, as shown in Figure 1. The link 27 is then so regulated that the pivot 30 abuts against the bottom of the guiding slot 29 (Figure 3). The following adjustments for preserving brake clearance, due to the wear of the brake lining of the brakes, will be effected automatically on behalf of the free wheel mechanism.

The rod 31 is connected to the brake pedal 36.

A spring 32 surrounding the shaft 14 is provided between a ring 33 keyed to the latter and a friction washer 34, guided in a groove 35, which washer brakes the shaft 14 to permit the return of the lever 16, against its stop 17, without leading said shaft 14.

The functioning of the device is as follows: When a pull is exerted upon the rod 31, the cam 8 is first caused to pivot in such a way that the brake shoes 3 and 3' come into contact with the drum 1. At this moment the cam 8 will have pivoted through an angle α, and the radius of the cam is then constant. During the rotation of the cam 8 corresponding to the angle α the rod 27 will have carried along the cheek 28 and brought the outer end of the slot guide 29 against the pivot 30. From that time, the pull upon the rod 31 being continued, the effort is transmitted to the lever 16, with a reduced stroke of the latter, since the shoes have been put into contact with the drum by the cam 8. The effort is then transmitted to the brake shoes by the device with screw wheels 12 and 13 and by the screws 22, 21 and nuts 24, 23. The lever 16, mounted as a free wheel upon the hub 15, carries the latter round with it by the jamming of the rollers 20, when it pivots in the direction of the arrow F.

At the time of release of the brakes, the effort upon the rod 31 ceasing, the lever 16 is returned against its stop 17 by the return spring 18. In this movement the hub 15 has remained motionless, due to the free-wheel device, but no force is any longer applied to the shoes 3 and 3'. The cam 8 is returned towards its normal position by the antagonistic spring 7, and the brake shoes then move away from the drum by an amount corresponding to the constant radius of the cam 8, diminished by the distance from the centre of the cam to the flat of the latter. Hence the spacing of the shoes after each braking is constant, whatever the wear of the brake linings may be.

What I claim is:

1. A vehicle brake device comprising in combination a brake drum, a brake adjusting member, a fixed support for the device, two brake shoes, a cam pivotally mounted in said support to cooperate with adjacent ends of the brake shoes, a traction spring between said brake shoes, a lever operated by the brake adjusting member to actuate said cam, oppositely directed screw-threaded devices bearing upon the ends of the brake shoes remote from said cam, worm and worm wheel mechanism for operating said screw-threaded devices, a free-wheel lever device whose length is greater than that of the cam operating lever to form an effort multiplying device and a rod mounted externally of the brake drum and connecting the ends of said levers.

2. A vehicle brake device according to claim 1, wherein the said rod has a lost motion connection to the free-wheel lever device to produce an operational lag relative to the displacement of the cam actuating lever.

3. A vehicle brake device according to claim 1, including a spring opposing operative movement of the free wheel lever device and a fixed stop to limit the angular displacement of said lever.

4. A vehicle brake device comprising in combination a brake drum, a brake adjusting member, a fixed support for the device, two brake shoes, a cam pivotally mounted in said support to cooperate with adjacent ends of the brake shoes, a traction spring between said brake shoes, a lever operated by the brake adjusting member to actuate said cam, a shaft rotatably mounted in said fixed support adjacent the ends of the brake shoes remote from the cam, a worm mounted on said shaft, a worm wheel meshing with said worm, two oppositely threaded screws arranged axially on opposite sides of said worm wheel, a nut on each of said screws pivotally linked to the ends of the brake shoes, a guide formed in said fixed support and in which said nuts are slidable, a lever to actuate said shaft, a free wheel clutch device interposed between said lever and shaft, means for opposing and limiting the angular displacement of said lever, a link connecting the cam actuating lever to the worm actuating lever and having a slot in one end thereof, and a stud at the end of the worm actuating lever for engaging said slot.

JEAN DESSART.

REFERENCES CITED

The following references are of record in the file of this patent:

UNITED STATES PATENTS

| Number | Name | Date |
|---|---|---|
| 1,860,011 | Brauks | May 24, 1932 |
| 1,974,943 | Baits | Sept. 25, 1934 |
| 2,006,418 | Turgot | July 2, 1935 |
| 2,435,977 | Morgan | Feb. 17, 1948 |

FOREIGN PATENTS

| Number | Country | Date |
|---|---|---|
| 231,438 | Great Britain | Aug. 27, 1925 |
| 525,487 | Great Britain | Aug. 29, 1940 |